United States Patent [19]

Scherer

[11] Patent Number: 5,134,769
[45] Date of Patent: Aug. 4, 1992

[54] METHOD AND APPARATUS FOR PREFORMING AND FINAL FORMING OF STATOR COIL END TURNS

[75] Inventor: Mark A. Scherer, Fort Wayne, Ind.

[73] Assignee: Advanced Machine and Tool Corporation, Fort Wayne, Ind.

[21] Appl. No.: 735,291

[22] Filed: Jul. 24, 1991

Related U.S. Application Data

[62] Division of Ser. No. 585,406, Sep. 20, 1990, Pat. No. 5,056,212.

[51] Int. Cl.⁵ .................... H02K 15/00; H02K 15/14; H02K 15/16
[52] U.S. Cl. ........................................ 29/596; 29/606; 29/732; 29/736
[58] Field of Search ............... 29/596, 598, 606, 732, 29/733, 734, 735, 736, 564.5, 33 L

[56] References Cited

U.S. PATENT DOCUMENTS

| | | |
|---|---|---|
| 2,506,173 | 5/1950 | Polard .................................. 29/736 |
| 2,980,157 | 4/1961 | Rediger ................................ 29/596 |
| 3,593,405 | 7/1971 | Hahn .................................. 29/205 R |
| 3,628,240 | 12/1971 | Bender ............................... 29/736 X |
| 3,629,925 | 12/1971 | Brown, Jr. et al. ............... 29/596 X |
| 3,753,282 | 8/1973 | Wiehl ................................. 29/205 D |
| 3,762,041 | 10/1973 | Bair ...................................... 29/596 |
| 3,841,133 | 10/1974 | Rice, Jr. ............................... 72/168 |
| 3,913,373 | 10/1975 | Kindig ................................. 72/355 |
| 4,003,116 | 1/1977 | Bale ..................................... 29/734 |
| 4,051,595 | 10/1977 | Bale ..................................... 29/596 |
| 4,106,189 | 8/1978 | Peters .................................. 29/736 |
| 4,216,571 | 8/1980 | Miller et al. ........................ 29/596 |
| 4,290,190 | 9/1981 | Arnold ................................ 29/596 |

FOREIGN PATENT DOCUMENTS 2043607 9/1970 Fed. Rep. of Germany .
2317798 7/1976 France .
0031739 11/1980 France .

Primary Examiner—Timothy V. Eley
Assistant Examiner—C. Richard Martin
Attorney, Agent, or Firm—Baker & Daniels

[57] ABSTRACT

An apparatus and method for performing and final forming the winding end turns of a stator. The apparatus includes an elongated arbor on the end of which includes a plurality of radially moveable blades and a cam. A pair of outer diameter jaws is positioned around the end turns whereby the arbor initially can move through the end turns to preform the end turns. After the arbor is moved into position, the end turns are final formed by reducing the volume of the end turn spaces defined by the outer diameter jaws. The coils are final formed by the movement of an end turn heights ring into the end turn spaces defined by the outer diameter jaws.

6 Claims, 4 Drawing Sheets

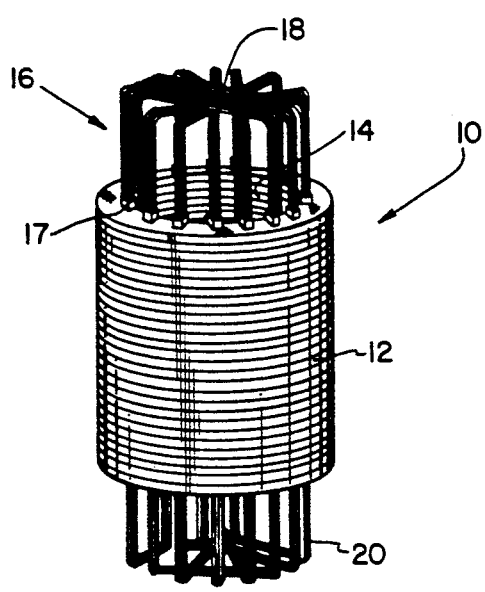
FIG. 1
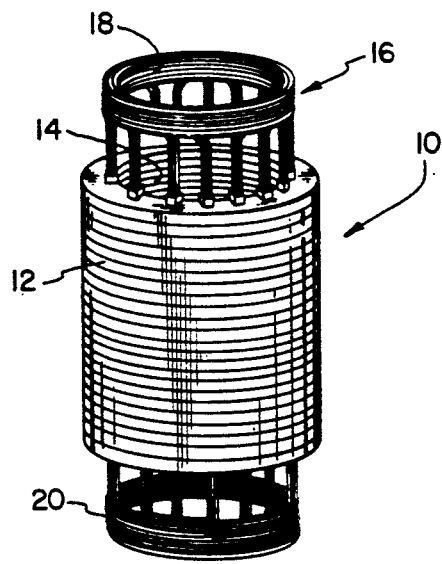
FIG. 2
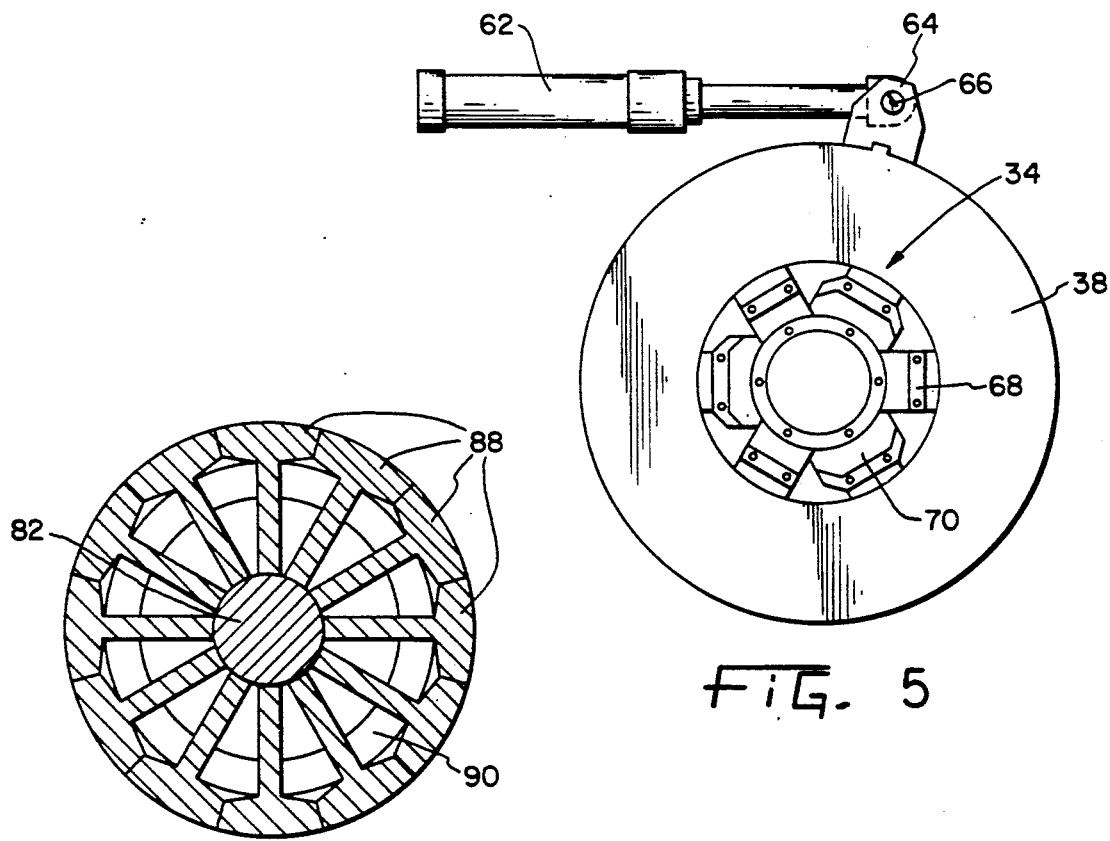
FIG. 5
FIG. 7

METHOD AND APPARATUS FOR PREFORMING AND FINAL FORMING OF STATOR COIL END TURNS

This is a division of application Ser. No. 07/585,406, filed Sep. 20, 1990 now U.S. Pat. No. 5,056,212.

BACKGROUND OF THE INVENTION

This invention relates to manufacturing of stators for electric motors and in particular to a method and apparatus for preforming and final forming stator coil end turns. Stators for electric motors are conventionally manufactured by constructing a stator core lamination stack, winding one or more sets of coils and inserting these coils through the stator bore into the stator slots. After insertion of the coils into the stator core the return ends of the coils extend out of the stator slots and beyond the ends of the stator core. For reasons of appearance as well as customer specifications, the coil ends need to be shaped into a particular desired configuration. Such shaping operations are conventionally referred to as forming or blocking operations and conventionally have included a preforming operation wherein the wire was moved out of the extended bore of the stator and a final forming operation in which the end wires were shaped into the desired configuration. In the past, the preforming and final forming operations consisted of two distinct operations wherein, during the preforming operation, a preforming arbor was inserted into and extended through the bore of the stator to push the wires back from the extended stator bore. After this preforming operation the stator was transferred to another machine for final forming of the wire.

It is therefore desired to provide a method and apparatus for both preforming and final forming of stator coil end turns in one continuous set of operations in a single station.

A further problem with the prior art final forming operation has been that the coil end turn wires tended to be pinched by the outer diameter jaws as these jaws were positioned around the end turns. Such pinching was likely to damage the wire on the wire insulation. It is therefore desired to provide a final forming apparatus which does not pinch the coil end turn wires.

SUMMARY OF THE INVENTION

The present invention overcomes the disadvantages of the above-described prior art methods and apparatus by providing an improved method and apparatus therefor.

The method according to the present invention comprises providing a single arbor having an end and two outer diameter forming members. The arbor is initially inserted into the first coil end turns at one end of the stator to preform those end turns. Thereafter the outer diameter form members are positioned around both the first and second coil end turns. The arbor is then axially moved through the stator bore to preform the end turns at the other end of the stator. The arbor is thereafter positioned in a predetermined axial position and an inner diameter form member is inserted into the first coil end turns. The outside form members are then moved inwardly to form an end turn space required for the first end turns. An end turn height ring is then inserted into the space defined by the outer diameter form members at the first end of the stator to final form the stator first coil end turns. Outside form members are moved inwardly to form the form space required for the second end turns. After this a plurality of radially movable blades mounted on the arbor end are moved radially outwardly to final form the coil end turns at the second end of the stator. An end turn height ring is then inserted into space to final form the second end turns.

The apparatus for preforming and final forming the winding end turns comprises a holding fixture for holding a stator and an elongated arbor one end of which includes a plurality of radially moveable blades. At least one of the blades includes a camming surface. A cam is cooperatively associated with the camming surface for camming the blades radially outwardly and final forming the end turns at one end of the stator. Two outer diameter jaws are provided to define respective first and second annular end turns spaces circumferentially around the respective coil end turns at each end of the stator. An end turn height ring is provided at each stator end for respective insertion into the annular end turn spaces defined by the outer diameter jaws. An inner diameter sleeve is provided at one end of the stator for insertion into the end turns at a first stator end to define the inner diameter of those end turns. The outer diameter jaws are segmented and the segments are moved sequentially to prevent pinching of the coil end turn wires during positioning of the jaws. Furthermore the segments may have shoulders thereon to prevent end turn coil wire from escaping by being squeezed outside of the end turn spaces defined by the outer diameter jaws.

An advantage of the present invention is that it permits the preforming and the final forming of the coil end turns in a single fixture with a single continuous operation. Accordingly the method and apparatus of the present invention decrease the amount of time required to manufacture the stator and therefore increase the efficiency of the stator manufacturing process.

A further advantage of the present invention is that it eliminates or reduces pinching and consequent damaging of wire during the final forming operation.

The method of the present invention, in one form thereof, comprises aligning the bore of a stator axially with an arbor and inserting the arbor end into the first end turns of a stator to preform the first end turns. First and second outer diameter forming jaws are then positioned around the first and second end turns to capture the first and second end turns respectively within the first and second end turn spaces. The arbor end is then moved axially through the stator bore and the second end turns to preform the second end turns. The arbor end is then positioned in a predetermined axial position. An inner diameter form sleeve is then inserted into the first end turn space, the first outer forming jaws are moved inwardly to form the first end turn space required for the first end turns, and a first end turn height ring is also moved into the first end turn form space to final form the first end turns. The second end turn outer forming jaws are then positioned to form the second end turn form space and a plurality of blades are moved radially outwardly into the second end turn form space for the second end turns. Finally the second end turn height ring is then positioned into the second end turn space to final form the second end turns.

The method according to the present invention, in one form thereof, comprises inserting an arbor end into the first end turns to preform the first end turns, positioning the first and second outer diameter form members respectively around the first and second coil end turns to define respectively the first and second end turn form spaces and to capture respectively the first and second end turns within the first and second end turn form spaces. The arbor end is then moved axially through the stator bore and the second end turns for performing the second end turns. The arbor end is then positioned in a predetermined axial position. The inner diameter form member is then inserted into the first end turns and the volume of the first end turn form space is reduced to final form the first end turns. The volume of the second end turn form space is then reduced to final form the second end turns.

The present invention, in one form thereof, comprises an apparatus for preforming and final forming the winding end turns of a stator in a stator winding apparatus. The apparatus comprises an elongated arbor, the arbor having one end that is axially extendable to preform the winding end turns. Means are provided for holding a stator with is bore in axial alignment with the axially extendable arbor end. First and second means are provided for defining respective first and second end turn spaces circumferentially around the respective end turns of a held stator. First and second means are operatively associated with the first and second defining means for final forming the respective winding end turns.

The present invention, in one form thereof, comprises an apparatus for preforming and final forming the winding end turns of a stator in a stator winding apparatus. The apparatus comprises an elongated arbor which has one axially extendable end to preform the winding end turns. Means are provided for holding a stator with its bore in axial alignment with the axially extendable arbor end. First and second means are provided for defining respective first and second annular end turn form spaces circumferentially around the respective end turns of a held stator. A plurality of radially movable blades are mounted on the arbor. At least one of the blades includes a camming surface. The cam is operatively associated with a camming surface for camming the blades radially outwardly to final form the first winding turns. Means for final forming the second winding end turns are operatively associated with the second end turn space.

The present invention, in one form thereof, comprises an apparatus for preforming and final forming the winding end turns of a stator in a stator winding apparatus. The apparatus comprises an elongated arbor, the arbor having one end which is axially extendable to preform the winding end turns. Means are provided for holding the stator with its bore in axial alignment with the axially extendable arbor end. First and second means are provided to define respective first and second annular end turn spaces circumferentially around the respective end turns of a held stator. A plurality of radially moveable blades are mounted on the arbor, at least one of the blades including a camming surface. A cam is cooperatively associated with the camming surface for camming the blades radially outwardly to final form the first winding end turns. A sleeve is adapted to be axially positioned into the second end turn space and an end turn height ring is adapted to be axially positioned into the second end turn space to final form the second end turns.

It is an object of the present invention to provide a method and apparatus for preforming and final forming the end turns of a stator in one continuous operation in a single station.

It is a further object of the present invention to provide such an apparatus wherein the coil end turn wires are not pinched by the outer diameter jaws during positioning of the jaws around the stator end turns.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of a motor stator including end turns of inserted coils which have not been preformed or final formed;

FIG. 2 is a perspective view of a motor stator with preformed and final formed end turns;

FIG. 5 is a partial elevational view of the apparatus for positioning the outer diameter jaws;

FIG. 7 is an enlarged cross sectional view of the arbor taken along lines 7—7 of FIG. 4.

Corresponding reference characters indicate corresponding parts throughout the several views.

Figure 3:
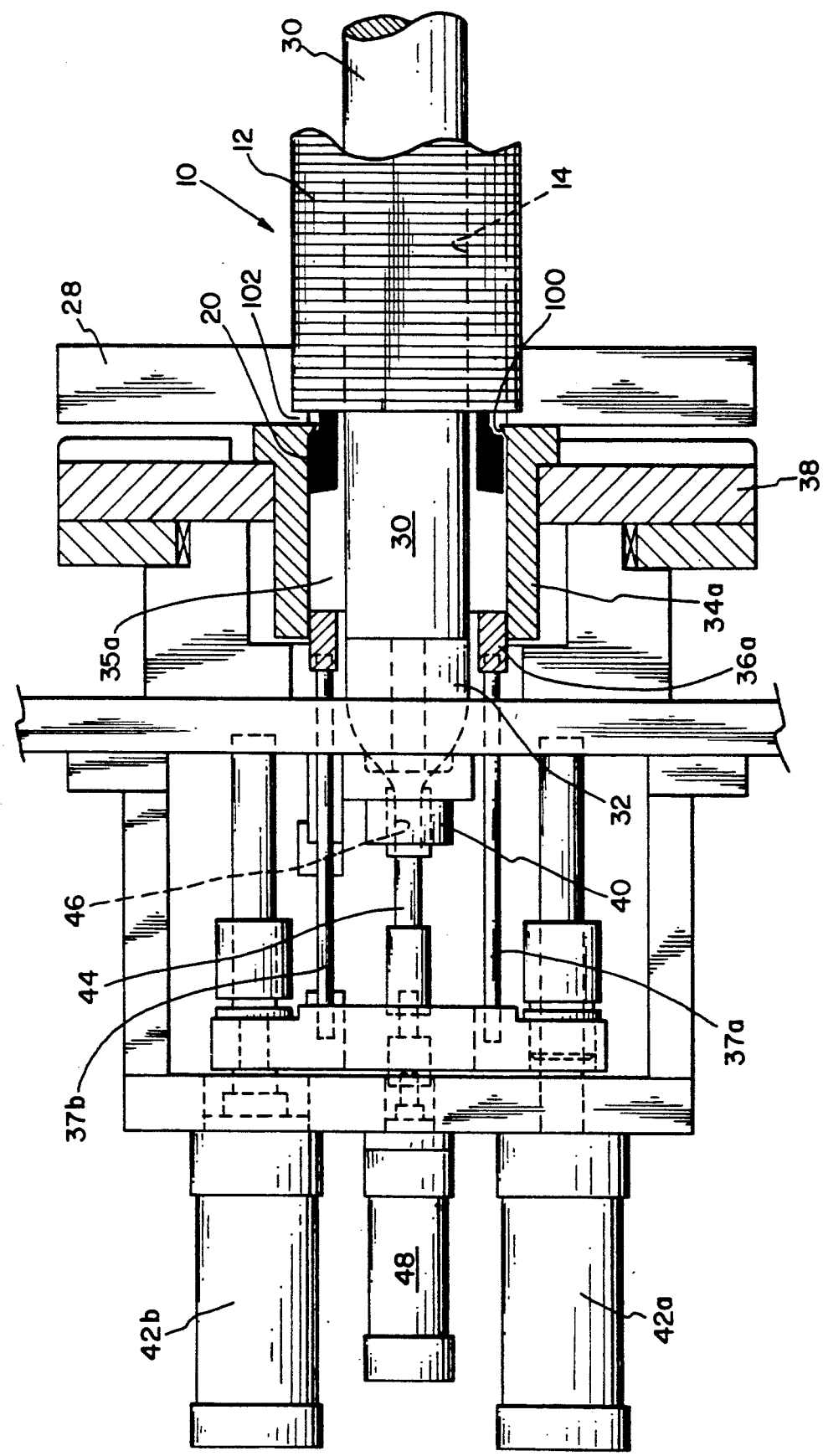
FIG. 3 is a partial elevational view, partially in cross-section, of an apparatus for preforming and final forming stator end turns with the arbor in its extended position.

The exemplification set out herein illustrates one preferred embodiment of the invention, in one form, and such exemplification is not to be construed as limiting the scope of the invention in any manner.

DESCRIPTION OF THE PREFERRED EMBODIMENT

Referring first to FIGS. 1 and 2 there is shown a stator 10 with a core 12 constructed of laminations, as is conventional. The core 12 includes a central bore 14 including slots 17 therein into which coils 16 have been inserted. The coils include end turns 18 and 20. In the representation of FIG. 1, the coils 16 have just been inserted into the stator core 12 and the coil end turns 18 and 20 have not yet been either preformed or final formed. In the representation of FIG. 2, the coil end turns 18 and 20 have been preformed and final formed. It can be seen in the representation of FIG. 2 that the central aperture of the bore extends through the coil end turns and that the coil end turns are neatly shaped.

Referring now to FIG. 3, there is shown an elevational representation of the apparatus according to the present invention. A stator 10 can be seen to be held in position by a cuff package 28. Only one side of the stator and cuff package is shown. However, the other side of cuff package 28 is the mirror image of the portion which is shown.

An arbor 30 is also shown extending through bore 14 of stator core 12. The arbor includes a bullet shaped arbor nose cap 32. An outer diameter jaw 34a is shown which surrounds end turns 20 and defines an end turn space 35a circumferentially around the arbor 30. Thus the coil end turns 20 are captured within the end turn space 35a. An end turn height ring 36a is positioned inside end turn space 35a by means of actuating rods 37a and 37b. The outer diameter jaw 34a is positioned to define end turn space 35a by means of an outer diameter jaw cam wheel 38. Arbor 30 is axially positioned against an arbor stop 40 to define an end position of the arbor. Initially, when the stator is positioned in package 28, the arbor is positioned to the right of its position as indicated in FIG. 3. Only after the stator 10 is positioned in the cuff package 28 does the arbor extend leftward through the stator 10 and to its final stop position as shown in FIG. 3 as further described hereinafter.

End turn height ring 36a is actuated by means of hydraulic cylinders 42a and 42b. Initially the end turn height ring 36a is retracted to the left as shown in FIG. 3. As further described hereinafter, only after end turn space 35a has been defined is the end turn height ring 36a positioned as shown in FIG. 3.

The pin 44 is also shown for insertion into a pin aperture 46 in arbor stop 40. The pin is actuated by means of a hydraulic cylinder 48. As further explained hereinafter, when pin 44 is actuated, a cam mounted in arbor 30 will be activated to final form the end turns 20.

Referring now to FIG. 5, the actuating mechanism for outer diameter jaw 34a is shown. Jaw 34a is shown to be segmented and includes segments 68 and 70. The segments 68 and 70 are of different shapes. Initially segments 68 and 70 are retracted whereby the outer diameter jaw 34a is not closed but open. Upon rotation of outer cam wheel 38 by means of cylinder 62 segments 68 and 70 are cammed into the closed position. Cam wheel 38 includes a lug 64 and a pin 66 whereby the linear movement of cylinder 62 can be translated into a rotating movement of outer diameter cam wheel 38. By means of camming connections (not shown) segments 68 and 70 are positioned as desired. It can also be seen that segments 70 are initially moved to their closed position before segments 68. This arrangement prevents pinching of coil wire as further explained hereinafter. Only thereafter are segments 68 moved in position to completely close the jaw 34a and to form the end turn space 35.

Figure 4:
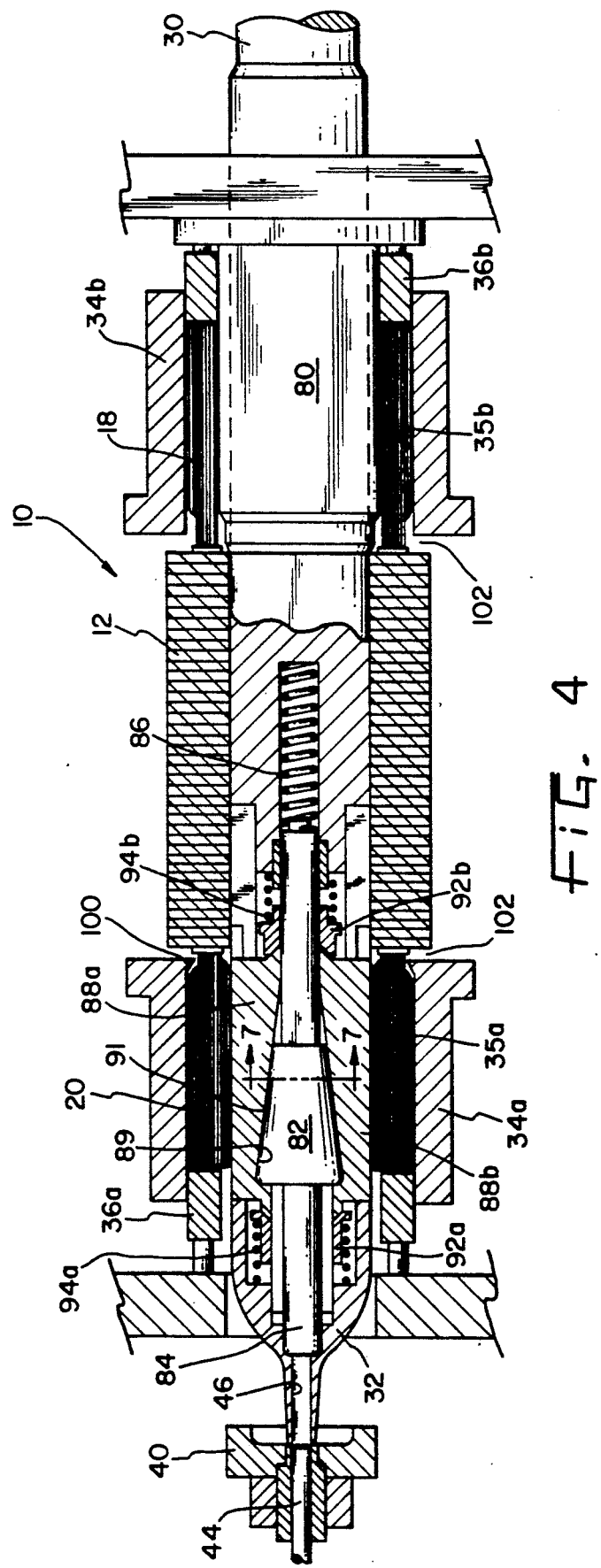
FIG. 4 is a partial cross sectional elevational view of the arbor during the final forming operation of the lead end stator end turns.

Referring now to FIG. 4, it can be seen that the stator 10 is in position and arbor 30 has been inserted through the stator bore 14. Two end turn spaces 35a and 35b have been formed by the closing of outer diameter jaws 34a and 34b. Jaws 34a and 34b are similar in structure. Furthermore, an inner diameter sleeve 80 has been moved into position inside lead end (LE) coil end turns 18 to define the desired inner diameter thereof. Additional end turn height ring 36b has been moved into position to final form end turns 18 into their desired shape. Thus the end turn space 35b has been reduced in volume by the actuation of end turn height ring 36b. The movement of end turn height ring final forms end turns 18.

Similarly, as shown in FIG. 4, the other lead end (OLE) side of the stator 10 includes end turns 20 which have been final formed. End turn height ring 36a has been moved into the desired final forming position. Furthermore, a cam 82 internally of arbor 30 has been actuated by means of a cam extension 84 which makes contact with pin 44. As pin 44 moves toward the right as shown in FIG. 4, cam 82 is also moved to the right against the biasing pressure of a spring 86. As the cam 82 moves toward the right, blades 88 which are mounted in a cage 90 will be actuated by cam 82 by interaction of surfaces 89 on blades 88 with surface 91 of cam 82. As blades 88 move outwardly against the pressure of biasing springs 94a and 94b, blades 88 will final form the inter diameter of OLE end turns 20.

Figure 6:
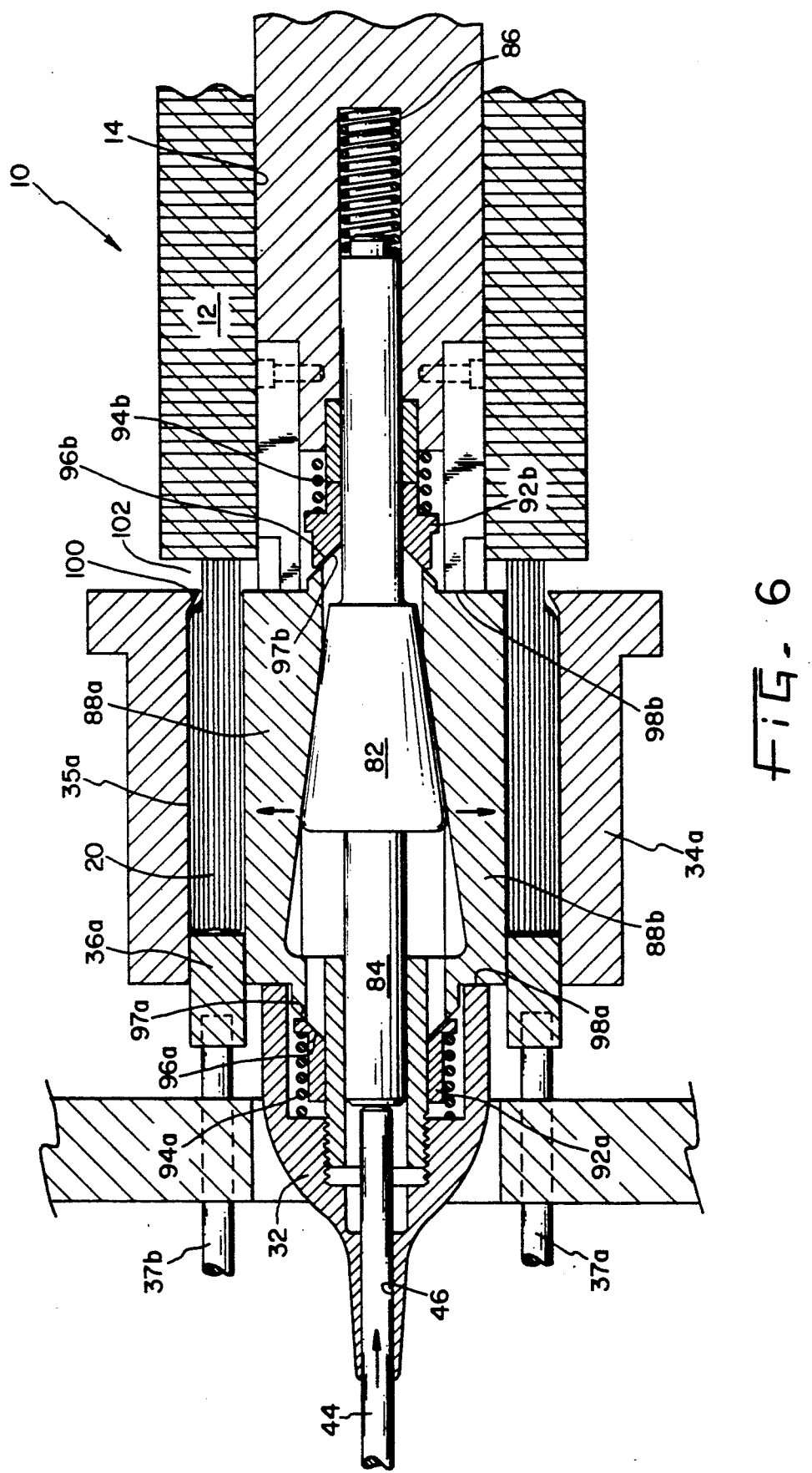
FIG. 6 is a partial elevational view, in cross section, of the arbor and stator during the final forming operation of the opposite lead end stator end turns.

The camming mechanism of the arbor blades is more specifically shown in FIG. 6. It can be seen that springs 94a and 94b are respectively mounted in retraction cups 92a and 92b. It can also be seen that blades 88 cannot tilt relative to the arbor axis as hardened surfaces 98a of the arbor interact with the blades to prevent blade tilting. In the representation of FIG. 6 it can be seen that cam 82 has moved to the right and that blades 88a and 88b have moved outwardly. Springs 94a and 94b have been compressed and cam surfaces 96 of retraction cups 92a and 92b have interacted with blades 88a and 88b. It can also readily be seen that if pin 44 were to be retracted, springs 94a, 94b would force cups 92a and 92b to their retracted positions which would cause camming surfaces 96 to interact with camming surfaces 97a and 97b of the blades and retract the blades to their rest positions inwardly of the positions shown in FIG. 6. Additionally, cam 82 would be urged, by spring 86 to its rest position toward the left of its position shown in FIG. 6.

Referring to FIG. 7, the arbor cage 90 is shown which houses blades 88. Cam 82 is also shown in FIG. 7. The initial position of the blades 88, before the actuation of pin 44 and cam 82, is shown as in FIG. 7. Upon the actuation of pin 44, cam 82 causes blades 88 to move radially outwardly from their positions as shown in FIG. 7 to their positions as shown in FIG. 6.

The operation of the device is as follows: the stator 10 is initially loaded into the cuff package 28. Cuff package 28 consists of two clamping devices between which the stator 10 is clamped. Cuff package 28 can conventionally swing out of its loaded position for insertion of the stator 10 by an operator. Cuff package 28 is then swung back to its operative position as shown in FIG. 3 whereby the stator bore is coaxially aligned with arbor 30. Arbor nose cap 32 is now inserted into the LE (lead end) end turns 18 of the stator 10. By means of this insertion, the end turns as shown in FIG. 1, will be opened up or separated by arbor nose cap 32. As shown in FIGS. 3, 4, and 6, nose cap 32 has a pointed or bullet shaped end whereby it is easily inserted into the end turns 18 and 20 so that it will gradually preform the end turns 18 and 20 as the arbor 30 is moved toward the left as shown in FIGS. 4. Thus the arbor will actually open up an aperture in the end turns. After the arbor nose cap 32 has been positioned into LE end turns 18, arbor 30 is stopped. LE outer diameter jaws 34b will now be moved into a position wherein they surround the LE end turns 18 and are fully opened. At the same time OLE (opposite lead end) outer diameter jaws 34a will also have moved into position to surround OLE coil end turns 20. Jaws 34a will also be fully opened. As described in connection with FIG. 5, jaw segments 70 will first move into position after which jaw segments 68 will move into position. By this sequence of operations, pinching of wires between the jaw segments will be prevented because, if any wires extend out of the partially opened jaws after segments 70 have closed, segments 68 will move into position and then force these stray wires back into position without pinching them.

The arbor 30 will now be actuated again to move further leftward through bore 14. As the arbor 30 is actuated and moves to the left as shown in FIG. 4, nose cap 32 will encounter OLE end turns 20 and will preform those end turns by opening up and forming an aperture therethrough. Arbor 30 will continue to move to the left until it encounters stop 40 and comes to rest. At this point in the operation, both the LE end turns 18 and the OLE end turns 20 have thus been preformed. The inner diameter sleeve 80 will now be moved into position by telescoping over arbor 30. The lead end of sleeve 80 is tapered as shown in FIG. 4 whereby the insertion of sleeve 80 into the preformed LE end turns 18 is easily accomplished.

Both LE jaw 34b and OLE jaw 34a will now be fully closed. By referring to FIGS. 4 and 6 it can be seen that jaws 34a and 34b include internal shoulders 100. These shoulders are helpful in preventing end turn wire which has been captured in end turn spaces 35a and 35b from escaping through the gap 102 between outer diameter jaws 35 and stator core 12. Such shoulders may be used depending on the specific needs and the stator design.

The end turn height rings 36a and 36b are now moved into their final forming positions. In the case of the LE end of the stator 10, the movement of the end turn height ring 36b will actually final form LE end turns 18 as the inner diameter of the end turns 18 has already been determined by the insertion of sleeve 80 and the outer diameter of end turns 18 has already been determined by the closing of outer diameter jaws 34b. By movement of end turn height ring 36b, the volume of the end turn space 35b will be reduced and end turns 18 will be final formed. Movement of end turn height ring 36b may also cause the coils to move slightly leftward through the slots of stator 10 whereby the coils will move a small distance into end turn space 35a, thus helping to center the coils 18 and 20 within the stator core 10. However such movement is rather small and depends upon the friction between the coils 16 and the slots 17 of stator 10.

Pin 44 is now actuated to cause cam 82 to move to the right as shown in FIG. 6. Movement of cam 82, as described hereinabove will cause movement of blades 88 radially outwardly into end turn space 35a to reduce the volume thereof. This movement happens after the blades 88 have moved. The OLE end turn height ring 36a is now moved into position as shown in FIG. 4. By positioning end turn height ring 36a into its final forming position, OLE end turns 20 are final formed.

The arbor 30, blades 88, pin 44, cam 82, outer diameter jaws 34, and inner diameter sleeve 80 are now retracted, the cuff package 28 is pivoted outwardly and stator 10 can be removed. The stator, after final forming will appear as shown in FIG. 2.

It should be noted that the particular shape desired for the end turns is a matter of choice and generally depends upon customer specifications. Further it should also be noted that the movement of the arbor through the sequence of steps as described hereinabove may be varied as desired to fit the particular production sequence required.

While this invention has been described as having a preferred design, it will be understood that it is capable of further modification. This application is therefore intended to cover any variations, uses, or adaptations of the invention following the general principles thereof and including such departure from the present disclosure as come within known or customary practice in the art to which this invention pertains and which fall within the limits of the appended claims.

What is claimed is:

1. A method for preforming and final forming winding end turns of a stator in one station of a stator winding apparatus, said stator having a through bore and windings, said windings having first and second end turns, said apparatus including an elongated arbor having at least one end and a plurality of movable blades, said at least one arbor end including an aperture therein, a pin adapted to be inserted into said arbor aperture, an inner diameter form sleeve, first and second segmented outer diameter form jaws, and first and second end turn height rings, said method comprising;

axially aligning the bore of a stator with said arbor;
inserting said at least one arbor end into said first end turns to preform said first end turns;
moving said first and second outer diameter form jaws around the first and second end turns to define respective first and second end turn form spaces and to respectively capture said first and second end turns within said first and second end turn form spaces;
relatively axially moving said at least one arbor end with respect to said stator bore and second end turns to preform said second end turns;
positioning said at least one arbor end in a predetermined axial position;
inserting said inner diameter form sleeve axially into said first end turns;
moving said first end turn height ring into said first end turn form space to final form said first end turns;
moving said blades radially outwardly into said second end turn form space to final form said second end turns; and
positioning said second end turn height ring into said second end turn form space.

2. The method according to claim 1 wherein said pin is axially inserted into said arbor aperture to move said blades radially outwardly.

3. The method according to claim 1 wherein said moving step of said outer diameter form jaws comprises initially moving the segments of said jaw circumferentially around said end turns, and moving said jaw segments only after said at least one arbor end has moved through said stator bore.

4. A method for performing and final forming winding end turns of a stator in a station of a stator winding apparatus, said stator having a through bore and windings, said windings having first and second end turns, said apparatus including an elongated arbor having at least one radially expandable end, an inner diameter form member, and first and second outer diameter form members, said method comprising:

aligning a stator axially with said arbor;
inserting said at least one arbor end into said first end turns to preform said first end turns;
positioning said first and second outer diameter form members respectively around the first and second coil end turns to define respective first and second end turn form spaces and to respectively capture said first and second end turns within said first and second end turn form spaces;
moving said at least one arbor end axially through said stator bore and said second end turns to preform said second end turns;
positioning said at least one arbor end in a predetermined axial position;
inserting said inner diameter form member into said first end turns;
reducing the volume of said first end turn form space to final form said first end turns; and reducing the volume of said second end turn form space to final form said second end turns.

5. The method according to claim 4 wherein said reducing step of said second end turn form space comprises radially expanding said at least one arbor end.

6. The method according to claim 4 wherein said reducing step of said first end turn from space comprises axially inserting a reducing member into said first end turn form space.

* * * * *